Jan. 15, 1963   J. S. PENNINGTON   3,072,988
WEDGE ANCHORS FOR GRIPPING PRESTRESSING TENDONS
Filed Oct. 20, 1960   2 Sheets-Sheet 1

Jan. 15, 1963   J. S. PENNINGTON   3,072,988
WEDGE ANCHORS FOR GRIPPING PRESTRESSING TENDONS
Filed Oct. 20, 1960   2 Sheets-Sheet 2
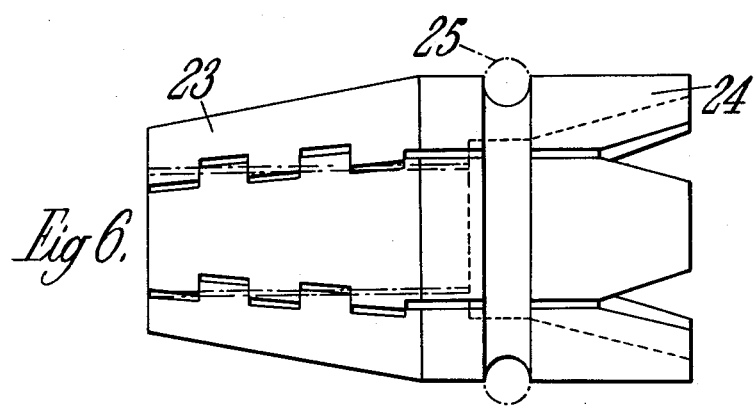
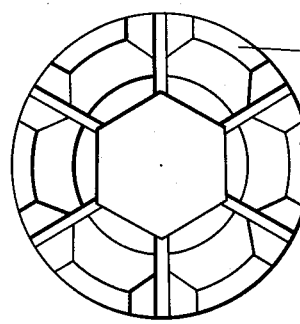
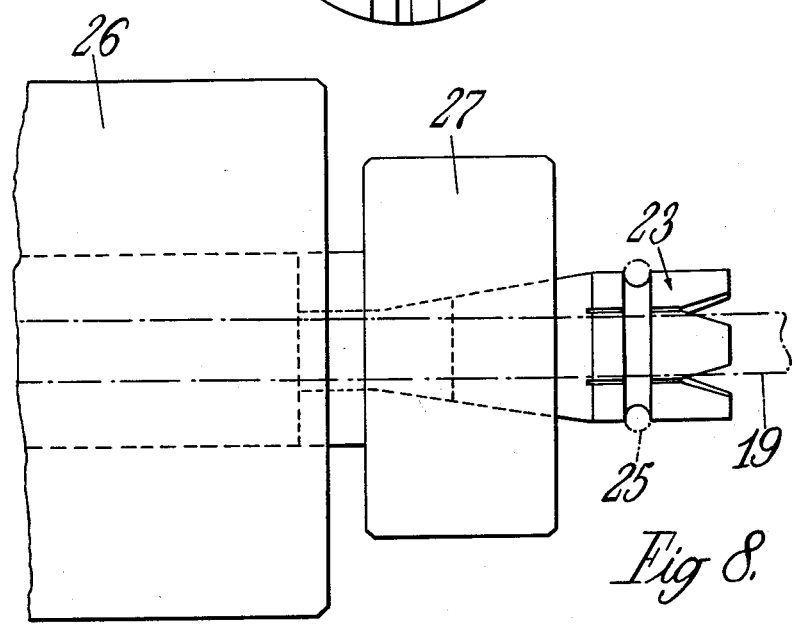

United States Patent Office 3,072,988
Patented Jan. 15, 1963

1

3,072,988
WEDGE ANCHORS FOR GRIPPING
PRESTRESSING TENDONS
John S. Pennington, Retford, England, assignor to
McCalls Macalloy Limited, Rotherham, England
Filed Oct. 20, 1960, Ser. No. 63,870
Claims priority, application Great Britain Aug. 25, 1960
1 Claim. (Cl. 24—126)

This invention relates to wedge anchors for gripping prestressing tendons comprised of steel bars or wire cables of substantially circular, oval, hexagonal or multi-angular shape in cross section. The wedge anchor of the present invention being adaptable to provide a static anchor for securing the ends of a tendon, or a pulling grip for the purpose of applying a tension to the tendon.

It is an object of this invention to provide a steel wedge anchor that will be capable of resisting the forces to which it is subjected and that will be capable of withstanding forces greater than the tendon which is being anchored can withstand.

It is an object of this invention to provide a wedge anchor that can be placed at any position on the tendon and will exert a substantially uniform pressure on all sides of the tendon when the forces are applied.

It is a further object of this invention to provide a wedge anchor that will be self-aligning at both ends of the tendon and self-seating when used as a static anchor to grip the end of the tendon opposite to that at which the tensioning force is applied.

It is a feature of plain wedges comprising a number of parts or segments commonly used for anchoring prestressing tendons, that gaps must be provided between the segments to allow the wedge to seat and to grip the tendon. Depending on the accuracy with which the segments are set up, the gaps will be relatively small or large. If the gaps are too small and close by reason of the relative dimensions of the wedge and tendon, the wedge may fail to seat and the tendon will not be securely anchored. If the gaps are too large the pressures will not be uniformly distributed over the surface of the tendon and the efficiency of the anchorage will be impaired. In the particular case of a hexagonal or multi-angular shaped tendon the material at the corners of the section may not be gripped at all. It is an important advantage to be able to eliminate this hazard in wedge anchorages.

In developing the wedge anchor of this invention it has been found important to be able to modify the shape of the internal surfaces of the wedge to conform to the shape of the prestressing tendon that is to be anchored, whilst retaining a conical exterior surface to suit the circular tapered hole in the anchor plate.

It has also been found important that the wedge be so designed that its internal anchoring surface will exert a substantially uniform pressure on all sides of the tendon, and in the case of hexagonal or multi-angular shapes will exert pressures at the corners of the tendons so that no part can escape the anchoring forces.

In order to accomplish the objects of this invention, it has been found that the wedge must consist of a number of parts which interlock with each other so as to act as a unit without allowing slippage between one part and another. The advantages of the present invention will be apparent from the following detailed description of an embodiment of the principles of this invention in providing anchorage for a hexagonal cable consisting of a number of straight wires, and by reference to the appended drawings.

It will be appreciated however that although the anchoring of a hexagonal cable tendon is referred to specifically in the following description the anchor wedge of the present invention is equally adaptable, by varying the shape of the inner surfaces of the segments forming the wedge to grip tendons of various shapes as hereinbefore referred to.

For a cable of hexagonal cross section the wedge is in six identical portions or segments.

In the accompanying drawings:

FIGURE 6 is an elevation of a modification of the wedge for use as a pulling grip;

FIGURE 7 is an end view looking towards the left of the modified wedge shown in FIGURE 6 and FIGURE 8 shows the method of using the pulling wedge of FIGURES 6 and 7.

Figure 1:
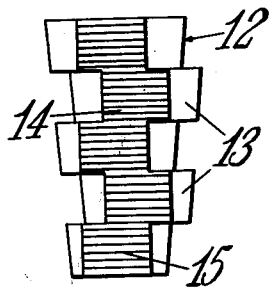
FIGURE 1 is an elevation of a segment forming a portion of the wedge according to the present invention.

In FIGURE 1 of the drawings each of the six segments 12 with its projecting lugs 13 has a flat interior face on which transverse serrations 14 are provided for the purpose of gripping the surface of the tendon. The interlocking lugs 13 ensure that the corners of the tendon are secured and at the same time prevent the segments 12 from becoming axially disaligned (i.e. the segments are thus axially self-aligning). The serrated surfaces of the wedge are preferably case hardened, or the whole of the wedge may be heat treated to a degree which enables the tendon to be securely gripped. The serrated surface towards the thin end 15 of each segment is relieved to provide for progressive transfer of stress between the wedge and the tendon.

Figure 2:
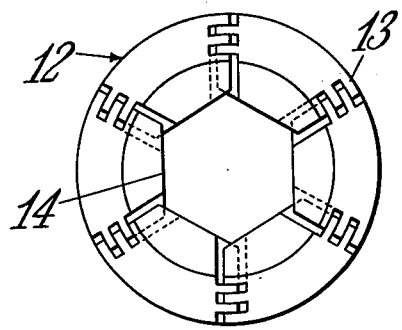
FIGURE 2 is a view looking towards the small end of the complete wedge assembled from six identical segments of FIGURE 1.
Figure 3:
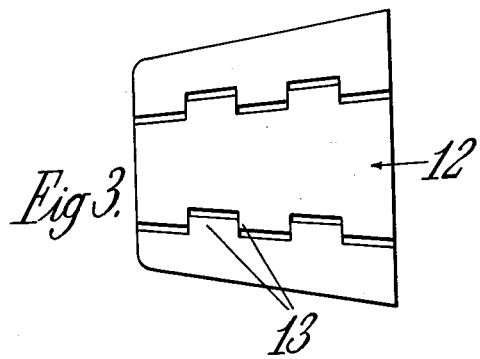
FIGURE 3 is a side elevation of the assembled wedge shown in FIGURE 2.
Figure 4:
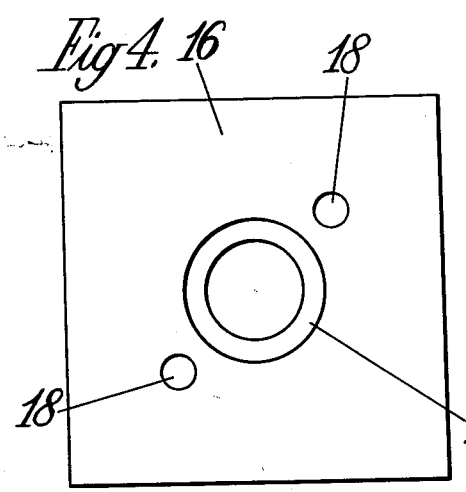
FIGURE 4 is an elevation of the anchor plate with the circular tapered hole in which the wedge is to be seated.
Figure 5:
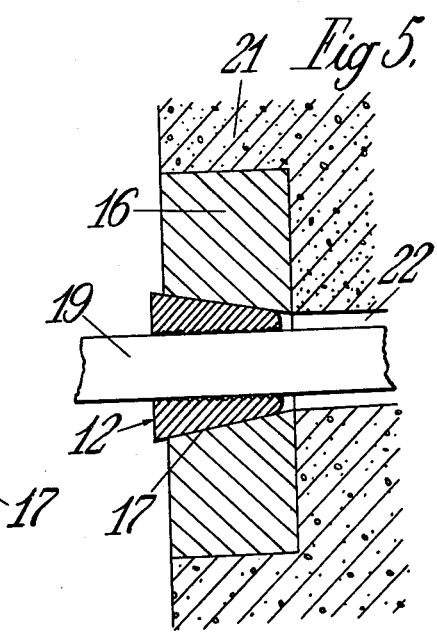
FIGURE 5 is a sectional elevation showing the wedge seated in the anchor plate.

In FIGURE 2 and FIGURE 3 the six segments 12 of the wedge are assembled with their lugs 13 interlocking. The interior flat serrated surfaces form a hexagonal prism and the smooth exterior surfaces form a right frustrum of a cone which seats in the tapered aperture 17 in the anchor plate 16 (FIGURES 4 and 5). The proportions of the segments of the wedge are designed to suit the cross-sectional dimensions of the tendon and safely to transmit the anchoring forces to the anchor plate.

It is therefore clear that the wedge segments 12 have their inner surfaces shaped so as to define together the faceted space corresponding to the polygonal section intended to be gripped. The serrations 14, that is the roughening of the inner surfaces, provide the means for gripping the tendons. Further, it is pointed out that the alternating series of recesses and projections defined by lugs 13 provide mutually interengaging means between each segment and the next recurrently along the axial extent of the wedge so that the projections of the segments extend across the junctions between the segments at a plurality of points along the axis of the wedge. This structural arrangement results in the gripping of the material of the tendon in the corners of the faceted space at a plurality of axially spaced points by the interengaging means of the segments, even though the wedge segments may not be in full mutual contact along their length.

FIGURE 4 shows the steel anchor plate 16. The tapered aperture 17 positioned centrally of the plate is designed to receive the wedge and two or more smaller apertures 18 may be provided to enable the anchor plate to be secured to the formwork of the member to be prestressed and also to provide a means of grouting the tendon. The dimensions of the anchor plate 16 and the quality of the steel from which it is made are designed to withstand the bursting stress applied thereto from the wedge when it is seated and to transfer the forces applied to the tendon safely to the member to be prestressed. The plate may be square, rectangular of circular in shape.

In FIGURE 5 the anchor plate and wedge form a static anchor for gripping one end of the tendon 19. The tendon is hexagonal in cross section and is shown passing through the aperture 17 in the anchor plate 16 which is bedded in the end of the member 21 to be prestressed. The tendon passes through a suitable cavity 22 in the member which enables the tendon to move freely when the tensioning force is applied thereto. In the assembly shown, the tensioning force has been applied to the tendon and the wedge 12 is seated so as to secure the tendon. The general method of applying a hydraulic jack to provide the tensioning force to the tendon is a known art and does not form a part of this invention. It is, however, necessary to provide means of temporarily securing the tendon to the moving parts of the hydraulic jack whilst the tension is being applied.

FIGURES 6 and 7 show an embodiment of the interlocking wedge modified for use as a pulling grip or wedge for attachment to the end of a tendon opposite to that shown in FIGURE 5 for the purpose of applying tension to the tendon by means of a hydraulic jack.

In FIGURE 6 the wedge portions of the pulling grip 23 have the same interlocking characteristics as the anchor wedge hereinbefore described and have extending portions 24 at one end and by which they may be handled. The portions or segments of the wedge are retained in assembled condition by a coil spring 25 extending around a transverse groove formed in each portion. This facilitates placing the pulling grip on the tendon and removing it after tensioning has been completed.

FIGURE 8 shows the tendon gripped by the wedge for the purpose of applying a tension thereto, the tendon 19 passing through the body 26 of the hydraulic jack and through the pulling head or plate 27 which is provided with a tapered aperture, similar to that provided in the anchor plate, in which the pulling grip 23 is seated. As the tensioning force is applied through the jack the wedge portions grip the tendon and may be released on removal of the force.

I claim:

A wedge and anchor plate assembly for gripping prestressing tendons of polygonal section comprising a plurality of wedge segments which, when fitted together form a composite annular section wedge adapted to seat in an anchor plate having a tapered aperture, the taper of which is complementary to the external taper of the wedge, said segments having inner surfaces that are shaped so as to define together a faceted space corresponding to the polygonal section of the tendon to be gripped, said inner surfaces also being roughened thereby providing means for gripping and anchoring the prestressing tendon, said wedge segments having an alternating series of projections and recesses providing mutually interengaging means between each wedge segment and the next recurrently along the axial extent of the wedge so that the projections on the segments extend across the junctions between the segments at a plurality of points along the axis of the wedge, the arrangement being such that the material of the tendon in the corners of the faceted space is effectively gripped at a plurality of axially spaced points by the interengaging means of the wedge segments, even though the wedge segments are not in full mutual contact along their length.

References Cited in the file of this patent

UNITED STATES PATENTS

| | | |
|---|---|---|
| 1,382,602 | Neilson | June 21, 1921 |
| 1,559,932 | Bogen | Nov. 3, 1925 |
| 2,063,718 | Berndt | Dec. 8, 1936 |
| 2,177,364 | Fotsch | Oct. 24, 1939 |
| 2,538,043 | Roy et al. | Jan. 16, 1951 |
| 2,712,455 | Neilon | July 5, 1955 |
| 2,988,727 | Berndt | June 13, 1961 |